US008068829B2

(12) United States Patent
Lemond et al.

(10) Patent No.: US 8,068,829 B2
(45) Date of Patent: Nov. 29, 2011

(54) SYSTEM FOR CUSTOMIZING ELECTRONIC SERVICES FOR DELIVERY TO A PASSENGER IN AN AIRBORNE WIRELESS CELLULAR NETWORK

(75) Inventors: Eric Lemond, Louisville, CO (US); Anand K. Chari, Bartlett, IL (US); Bryan A. Lauer, Hinckley, IL (US); Richard Clay Dunham, Schaumburg, IL (US); Thomas E. Weigman, Weston, CT (US); Joseph M. Cruz, Naperville, IL (US); Dennis G. Sladky, Chicago, IL (US); Michael A. Moffatt, Winfield, IL (US); Kenneth Targosz, Arlington Heights, IL (US)

(73) Assignee: Gogo LLC, Itasca, IL (US)

( * ) Notice: Subject to any disclaimer, the term of this patent is extended or adjusted under 35 U.S.C. 154(b) by 108 days.

(21) Appl. No.: 12/021,169

(22) Filed: Jan. 28, 2008

(65) Prior Publication Data
US 2008/0132212 A1 Jun. 5, 2008

Related U.S. Application Data

(63) Continuation-in-part of application No. 11/492,545, filed on Jul. 24, 2006, which is a continuation of application No. 10/730,329, filed on Dec. 7, 2003, now Pat. No. 7,113,780, which is a continuation-in-part of application No. 09/686,923, filed on Oct. 11, 2000, now Pat. No. 6,788,935.

(51) Int. Cl.
  *H04W 4/00* (2009.01)
  *G07B 15/02* (2011.01)
(52) U.S. Cl. .................... 455/431; 455/430; 235/384
(58) Field of Classification Search .............. 705/26, 705/65, 5, 34, 14; 455/412.1, 456, 456.3, 455/430, 431, 414.1, 425; 701/1, 201; 395/205; 709/206; 235/384, 492
See application file for complete search history.

(56) References Cited

U.S. PATENT DOCUMENTS
5,042,027 A 8/1991 Takase et al.
(Continued)

FOREIGN PATENT DOCUMENTS
WO WO-2006128946 A1 12/2006

OTHER PUBLICATIONS

Casewell, I.E.; "The Provision of GSM Cellular Radio Environments With Passenger Aircraft Operating Over Europe"; IEEE Fifth International Conference; Dec. 11-14, 1989; pp. 172-176.

*Primary Examiner* — Kiet Doan
(74) *Attorney, Agent, or Firm* — Patton Boggs LLP

(57) ABSTRACT

The Customized Electronic Services Delivery System provides customized electronic services to passengers who are located onboard an aircraft by storing data indicative of a plurality of electronic services that are available to passengers who are located onboard an aircraft, as well as data indicative of preferences of passengers for the plurality of electronic services. Once a correspondence is made between the electronic services and an identified passenger, the Customized Electronic Services Delivery System advises the passenger of the availability of the customized services and establishes wireless communications between the passenger's electronic device and the selected electronic service. The electronic services include in-flight entertainment services as well as destination-based services which link the passenger's existing travel plans with offers for additional services that are available to the passenger at their nominal destination and their planned travel schedule.

16 Claims, 9 Drawing Sheets

U.S. PATENT DOCUMENTS

| | | |
|---|---|---|
| 5,123,112 A | 6/1992 | Choate |
| 5,134,709 A | 7/1992 | Bi et al. |
| 5,212,804 A | 5/1993 | Choate |
| 5,408,515 A | 4/1995 | Bhagat et al. |
| 5,432,841 A | 7/1995 | Rimer |
| 5,519,761 A | 5/1996 | Gilhousen |
| 5,555,444 A | 9/1996 | Diekelman et al. |
| 5,590,395 A | 12/1996 | Diekelman |
| 5,651,050 A | 7/1997 | Bhagat et al. |
| 5,659,304 A | 8/1997 | Chakraborty |
| 5,678,174 A | 10/1997 | Tayloe |
| 5,740,535 A | 4/1998 | Rune |
| 5,754,959 A | 5/1998 | Ueno et al. |
| 5,805,683 A | 9/1998 | Berberich, Jr. |
| 5,887,258 A | 3/1999 | Lemozit et al. |
| 5,950,129 A | 9/1999 | Schmid et al. |
| 5,956,644 A | 9/1999 | Miller et al. |
| 5,995,805 A | 11/1999 | Ogasawara et al. |
| 6,002,944 A | 12/1999 | Beyda |
| 6,009,330 A | 12/1999 | Kennedy, III et al. |
| 6,055,425 A | 4/2000 | Sinivaara et al. |
| 6,144,338 A | 11/2000 | Davies |
| 6,263,206 B1 | 7/2001 | Potochniak et al. |
| 6,314,286 B1 | 11/2001 | Zicker |
| 6,392,692 B1 | 5/2002 | Monroe |
| 6,393,281 B1 | 5/2002 | Capone et al. |
| 6,430,412 B1 | 8/2002 | Hogg et al. |
| 6,577,419 B1 | 6/2003 | Hall et al. |
| 6,580,915 B1 | 6/2003 | Kroll |
| 6,690,928 B1 | 2/2004 | Konishi et al. |
| 6,735,438 B1 | 5/2004 | Sabatino |
| 6,735,500 B2 | 5/2004 | Nicholas et al. |
| 6,741,841 B1 | 5/2004 | Mitchell |
| 6,754,489 B1 | 6/2004 | Roux et al. |
| 6,760,778 B1 | 7/2004 | Nelson et al. |
| 6,788,935 B1 | 9/2004 | McKenna et al. |
| 6,880,750 B2 | 4/2005 | Pentel |
| 6,889,042 B2 | 5/2005 | Rousseau et al. |
| 6,910,628 B1 * | 6/2005 | Sehr .............................. 235/384 |
| 7,027,801 B1 * | 4/2006 | Hall et al. .................. 455/412.1 |
| 7,433,836 B1 * | 10/2008 | August et al. ................... 705/34 |
| 2002/0010633 A1 * | 1/2002 | Brotherston .................... 705/26 |
| 2002/0045444 A1 | 4/2002 | Usher et al. |
| 2002/0082912 A1 * | 6/2002 | Batachia et al. ................ 705/14 |
| 2002/0123344 A1 | 9/2002 | Criqui et al. |
| 2002/0155833 A1 | 10/2002 | Borel |
| 2003/0046118 A1 * | 3/2003 | O'Donnell ........................ 705/5 |
| 2003/0050746 A1 | 3/2003 | Baiada et al. |
| 2003/0100315 A1 * | 5/2003 | Rankin ....................... 455/456 |
| 2003/0154169 A1 * | 8/2003 | Yanai ............................. 705/65 |
| 2004/0203918 A1 | 10/2004 | Moriguchi et al. |
| 2005/0071076 A1 | 3/2005 | Baiada et al. |

\* cited by examiner

SYSTEM FOR CUSTOMIZING ELECTRONIC SERVICES FOR DELIVERY TO A PASSENGER IN AN AIRBORNE WIRELESS CELLULAR NETWORK

CROSS-REFERENCE TO RELATED APPLICATIONS

This application is a continuation-in-part of U.S. patent application Ser. No. 11/492,545 filed Jul. 24, 2006; which is a continuation of U.S. patent application Ser. No. 10/730,329 filed Dec. 7, 2003, now U.S. Pat. No. 7,113,780 issued Sep. 26, 2006; which is a continuation-in-part of U.S. patent application Ser. No. 09/686,923 filed Oct. 11, 2000, now U.S. Pat. No. 6,788,935 issued Sep. 7, 2004. This application is also related to a US patent application titled "System For Handoff Of Aircraft-Based Content Delivery To Enable Passengers To Receive The Remainder Of A Selected Content From A Terrestrial Location" and filed on the same date as the present application, and US patent application titled "System For Customizing Electronic Content For Delivery To A Subscriber In An Airborne Wireless Cellular Network" and filed on the same date as the present application.

FIELD OF THE INVENTION

This invention relates to cellular communications and, in particular, to a system that enables a passenger's wireless device to receive customized electronic services in an airborne wireless cellular network.

BACKGROUND OF THE INVENTION

It is a problem in the field of wireless communications to manage the wireless services provided to passengers who are located in an aircraft as they roam among cell sites in the non-terrestrial cellular communication network.

In the field of terrestrial cellular communications, it is common for a wireless subscriber to move throughout the area served by the network of their home cellular service provider and maintain their desired subscriber feature set. Feature set availability throughout the home network is managed by the home cellular service provider's database, often termed a Home Location Register (HLR), with data connections to one or more switches (packet or circuit), and various ancillary equipment, such as voice mail and short message servers, to enable this seamless feature set management.

If the wireless subscriber were to transition inter-network, from the coverage area of their home cellular network to a network of the same or another cellular service provider (termed "roaming cellular service provider" herein), the wireless subscriber should have the ability to originate and receive calls in a unified manner, regardless of their location. In addition, it should be possible for a given wireless subscriber's feature set to move transparently with them. However, for this feature set transportability to occur, there needs to be database file sharing wherein the home cellular service Home Location Register (HLR) transfers the subscriber's authorized feature set profile to the roaming cellular service provider's database, often called a Visitor Location Register, or VLR. The VLR then recognizes that a given roaming wireless subscriber is authorized for a certain feature set and enables the roaming cellular service provider network to transparently offer these features to the wireless subscriber. In this manner, the roaming wireless subscriber retains the same authorized feature set, or "subscriber class", as they had on their home cellular service provider network.

When wireless subscribers enter the non-terrestrial cellular communication network (that is, they fly in an aircraft as passengers), they encounter a unique environment that traditionally has been disconnected from the terrestrial cellular network, where the wireless network of the aircraft interfaces the subscriber (also termed "passenger" herein) to various services and content. The aircraft wireless network, therefore, can function as a content filter or can create unique types of content that are directed to the passengers who are on-board the aircraft. The management and generation of this content have yet to be addressed in existing wireless networks. In addition, various services which relate to the subscriber's travel plans and/or the flight on which the subscriber is traveling are presently not offered to the subscriber.

BRIEF SUMMARY OF THE INVENTION

The above-described problems are solved and a technical advance achieved in the field by the present System For Customizing Electronic Services For Delivery To A Subscriber In An Airborne Wireless Cellular Network (termed "Customized Electronic Services Delivery System" herein), which enables a passenger's wireless device, operating in an airborne wireless cellular network, to receive delivery of content which is customized for the particular subscriber.

The Customized Electronic Services Delivery System provides customized electronic services to passengers who are located onboard an aircraft by storing data indicative of a plurality of electronic services that are available to passengers who are located onboard the aircraft. The Customized Electronic Services Delivery System also stores data indicative of preferences of passengers for the plurality of electronic services and associates at least one of the plurality of electronic services with an identified passenger based on the stored data. Once a correspondence is made, the Customized Electronic Services Delivery System advises the passenger of the availability of the customized electronic services and is responsive to the passenger selecting a one of the plurality of electronic services for establishing wireless communications between the passenger's wireless device and the selected one electronic service.

The electronic services that are customized for the passenger include in-flight entertainment services, such as multimedia presentations, as well as destination-based services, which link the passenger's existing travel plans with offers for additional services that are available to the passenger at their nominal destination and their planned travel schedule. The passenger thereby is presented with opportunities during their flight to enhance their travel experience, both in-flight and at their destination.

This provision of the Customized Electronic Services Delivery System is accomplished in part by the use of an "Inner Network" that connects the two segments of the "Outer Network", comprising the Air Subsystem and the ground-based portion of the non-terrestrial cellular communication network. The Inner Network transmits both the subscriber traffic (comprising voice and/or other data) and feature set data between the Air Subsystem and the ground-based portion of the non-terrestrial cellular communication network to thereby enable the passenger's wireless devices that are located in the aircraft to receive consistent wireless communication services in both the terrestrial ground-based) and non-terrestrial regions.

DETAILED DESCRIPTION OF THE INVENTION

Overall System Architecture

Figure 1:
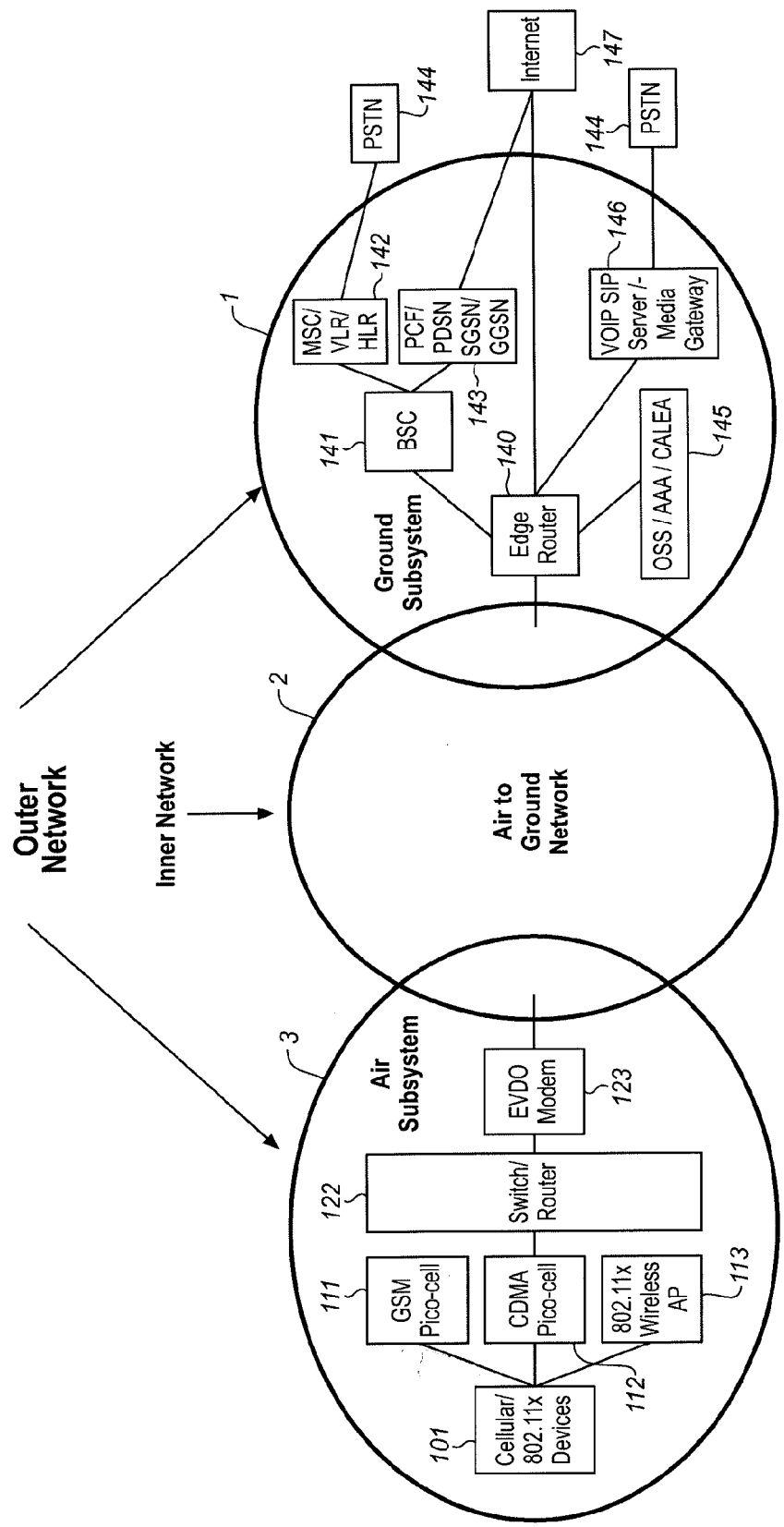
FIG. 1 illustrates, in block diagram form, the overall architecture of a composite air-to-ground network that interconnects an Air Subsystem with a Ground-Based Communication Network.

FIG. 1 illustrates, in block diagram form, the overall architecture of a typical non-terrestrial cellular communication network, which includes an Air-To-Ground Network 2 (Inner Network) that interconnects the two elements of an Outer Network, comprising an Air Subsystem 3 and Ground Subsystem 1. This diagram illustrates the basic concepts of the non-terrestrial cellular communication network and, for the purpose of simplicity of illustration, does not comprise all of the elements found in a typical non-terrestrial cellular communication network. The fundamental elements disclosed in FIG. 1 provide a teaching of the interrelationship of the various elements which are used to implement a non-terrestrial cellular communication network to provide content to passengers' wireless devices which are located in an aircraft.

The overall concept illustrated in FIG. 1 is the provision of an "Inner Network" that connects the two segments of the "Outer Network", comprising the Air Subsystem 3 and the Ground Subsystem 1. This is accomplished by the Air-To-Ground Network 2 transmitting both the passenger communication traffic (comprising voice and/or other data) and control information and feature set data between the Air Subsystem 3 and the Ground Subsystem 1 thereby to enable the passengers' wireless devices that are located in the aircraft to receive services in the aircraft.

Air Subsystem

The "Air Subsystem" is the communications environment that is implemented in the aircraft, and these communications can be based on various technologies, including but not limited to: wired, wireless, optical, acoustic (ultrasonic), and the like. An example of such a network is disclosed in U.S. Pat. No. 6,788,935, titled "Aircraft-Based Network For Wireless Subscriber Stations".

The preferred embodiment for the Air Subsystem 3 is the use of wireless technology and for the wireless technology to be native to the passengers' wireless devices that passengers and crew carry on the aircraft. Thus, a laptop computer can communicate via a WiFi or WiMax wireless mode (or via a wired connection, such as a LAN), or a PDA could communicate telephony voice traffic via VoIP (Voice over IP). Likewise, a handheld cell phone that uses the GSM protocol communicates via GSM when inside the aircraft to the Air Subsystem. A CDMA cell phone would use CDMA and an analog AMPS phone would use analog AMPS when inside the aircraft to the Air Subsystem 3. The connection states could be packet switched or circuit switched or both. Overall, the objective on the Air Subsystem 3 is to enable seamless and ubiquitous access to the Air Subsystem 3 for the passengers' wireless devices that are carried by passengers and crew, regardless of the technology used by these wireless devices.

The Air Subsystem 3 also provides the mechanism to manage the provision of services to the passengers' wireless devices that are operating in the aircraft cabin. This management includes not only providing the passenger traffic connectivity but also the availability of non-terrestrial specific feature sets which each passenger is authorized to receive. These features include in-flight entertainment services, such as multi-media presentations, as well as destination-based services which link the passenger's existing travel plans with offers for additional services that are available to the passenger at their nominal destination and their planned travel schedule. The passenger thereby is presented with opportunities during their flight to enhance their travel experience, both in-flight and at their destination.

The passengers' wireless devices 101 used in the aircraft can be identical to those used on the cellular/PCS ground-based communication network 1; however, these passengers' wireless devices 101 are pre-registered with the carrier serving the aircraft and/or users have PIN numbers for authentication. In addition, an antenna interconnects the passengers' wireless devices 101 with the in-cabin Base Transceiver Stations (BTS) 111-114, which are typically pico-cells with BSC/MSC functions integrated. BTS/BSC/MSC modules are added for each air-interface technology supported. The Switch/Router 122 acts as the bridging function (for media/content and signaling to a limited extent) between the Air Subsystem 3 and the ground-based communication network 1, since the Switch/Router 122 places a call using the Modem 123 to the ground-based communication network 1 via the Air-To-Ground Network 2.

Air-To-Ground Network

The Air-to-Ground Network 2 shown in FIG. 1 is clearly one that is based on wireless communications (radio frequency or optical) between the ground-based communications network 1 and the passengers' wireless devices that are located in the aircraft, with the preferred approach being that of a radio frequency connection. This radio frequency connection takes on the form of a cellular topology where typically more than one cell describes the geographic footprint or coverage area of the composite Air-To-Ground Network 2. The air-to-ground connection carries both passenger communications traffic and native network signaling traffic.

Alternatively, the Air-To-Ground Network 2 could be achieved through a wireless satellite connection where radio frequency links are established between the aircraft and a satellite and between the satellite and the ground-based communications network 1, respectively. These satellites could be geosynchronous (appears to be stationary from an earth reference point) or moving, as is the case for Medium Earth Orbit (MEO) and Low Earth Orbit LEO). Examples of satellites include, but are not limited to: Geosynchronous Ku Band satellites, DBS satellites (Direct Broadcast Satellite), the Iridium system, the Globalstar system, and the Inmarsat system. In the case of specialized satellites, such as those used for Direct Broadcast Satellite, the link typically is unidirectional, that is, from the satellite to the receiving platform, in this case an aircraft. In such a system, a link transmitting unidirectionally from the aircraft is needed to make the communication bidirectional. This link could be satellite or ground-based wireless in nature as previously described. Last, other means for communicating to aircraft include broad or wide area links such as High Frequency (HF) radio and more unique systems such as troposcatter architectures.

The Air-To-Ground Network 2 can be viewed as the conduit through which the passenger communications traffic as well as the control and network feature set data is transported between the Ground Subsystem 1 and the Air Subsystem 3. The Air-To-Ground Network 2 can be implemented as a single radio frequency link or multiple radio frequency links, with a portion of the signals being routed over different types of links, such as the Air-To-Ground Link and the Satellite Link. Thus, there is a significant amount of flexibility in the implementation of this system, using the various components and architectural concepts disclosed herein in various combinations.

Ground Subsystem

The Ground Subsystem 1 consists of Edge Router 140 which connects the voice traffic of the Air-To-Ground Network 2 with the traditional cellular communication network elements, including a Base Station Controller 141 and its associated Mobile Switching Center 142 with its Visited Location Register, Home Location Register to interconnect the voice traffic to the Public Switched Telephone Network 144, and other such functionalities. In addition, the Base Station Controller 141 is connected to the Internet 147 via Public Switched Data Network 143 for call completions. Edge Router 140 also provides interconnection of the data traffic to the Internet 147, Public Switched Data Network 144 via Voice Over IP Server 146, and other such functionalities. These include the Authentication Server, Operating Subsystems, CALEA, and BSS servers 145.

Thus, the communications between the passengers' wireless devices 101 located in an aircraft and the Ground Subsystem 1 of the ground-based communication network are transported via the Air Subsystem 3 and the Air-To-Ground Network 2 to the ground-based Base Station Controllers 141 of the non-terrestrial cellular communication network. The enhanced functionality described below and provided by the Air Subsystem 3, the Air-To-Ground Network 2, and the ground-based Base Station Controllers 141 renders the provision of services to the passengers' wireless devices 101 located in an aircraft transparent to the passengers.

Typical Aircraft-Based Network

Figure 2:
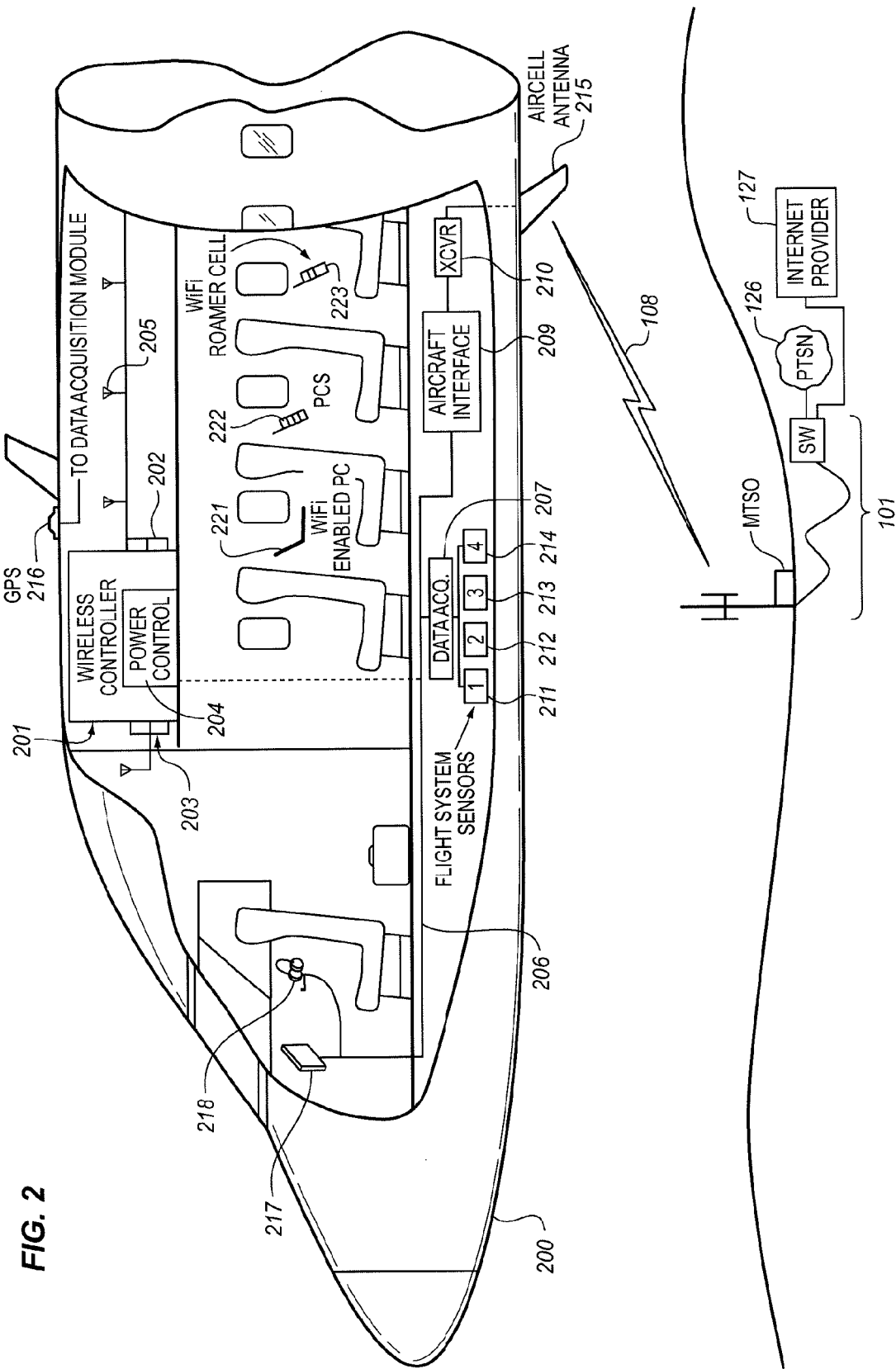
FIG. 2 illustrates, in block diagram form, the architecture of a typical embodiment of a typical aircraft-based network for wireless devices as embodied in a multi-passenger commercial aircraft.

FIG. 2 illustrates the architecture of a typical aircraft-based network for passengers' wireless devices as embodied in a multi-passenger commercial aircraft 200. This system comprises a plurality of elements used to implement a communication backbone that is used to enable wireless communication for a plurality of wireless communication devices of diverse nature. The aircraft-based network for passengers' wireless devices comprises a Local Area Network 206 that includes a radio frequency communication system 201 that uses a spread spectrum paradigm and having a short range of operation. This network 206 supports both circuit-switched and packet-switched connections from passengers' wireless devices 221-224 and interconnects the communications of these passengers' wireless devices 221-224 via a gateway transceiver or transceivers 210 to the Public Switched Telephone Network (PSTN) 126 and other destinations, such as the Internet 127 or Public Switched Data Network (PDSN). The wireless passengers thereby retain their single number identity as if they were directly connected to the Public Switched Telephone Network. The passengers' wireless devices 221-224 include a diversity of communication devices, such as laptop computers 221, cellular telephones 222, MP3 music players (not shown), Personal Digital Assistants (PDA) (not shown), WiFi-based devices 223, WiMax-based devices 224, and the like, and for simplicity of description are all collectively termed "passengers' wireless devices" herein, regardless of their implementation specific details.

The basic elements of the aircraft-based network for passengers' wireless devices comprises at least one antenna 205 or means of coupling electromagnetic energy to/from the Air Subsystem 3 located within the aircraft 200 which serves to communicate with the plurality of passengers' wireless devices 221-224 located within the aircraft 200. The at least one antenna 205 is connected to a wireless controller 201 that encompasses a plurality of elements that serve to regulate the wireless communications with the plurality of passengers' wireless devices 221-224. The wireless controller 201 includes at least one low power radio frequency transceiver 202 for providing a circuit switched communication space using a wireless communication paradigm, such as PCS, CDMA, or GSM, for example. In addition, the wireless controller 201 includes a low power radio frequency transceiver 203 for providing a data-based packet switched communication space using a wireless communication paradigm, such as WiFi (which could also convey packet switched Voice over Internet Protocol (VoIP)).

Finally, the wireless controller 201 includes a power control segment 204 that serves to regulate the power output of the plurality of passengers' wireless devices. It also serves to, by RF noise or jamming means, prevent In-Cabin passengers' wireless devices from directly and errantly accessing the ground network when in a non-terrestrial mode. The ultra-low airborne transmit power levels feature represents a control by the Power Control element 204 of the wireless controller 201 of the aircraft-based network for passengers' wireless devices to regulate the output signal power produced by the passengers' wireless devices 221-224 to minimize the likelihood of receipt of a cellular signal by ground-based cell sites or ground-based passengers' wireless devices.

It is obvious that these above-noted segments of the wireless controller 201 can be combined or parsed in various ways to produce an implementation that differs from that disclosed herein. The particular implementation described is selected for the purpose of illustrating the concept of the invention and is not intended to limit the applicability of this concept to other implementations.

The wireless controller 201 is connected via a Local Area Network 206 to a plurality of other elements which serve to provide services to the passengers' wireless devices 221-224. These other elements can include an Aircraft Interface 209 for providing management, switching, routing, and aggregation functions for the communication transmissions of the passengers' wireless devices. A data acquisition element 207 serves to interface with a plurality of flight system sensors 211-214 and a Global Positioning System element 216 to collect data from a plurality of sources as described below. Furthermore, pilot communication devices, such as the display 217 and headset 218, are connected to this Local Area Network 206 either via a wired connection or a wireless connection.

Finally, a gateway transceiver(s) 210 is used to interconnect the Aircraft Interface 209 to an antenna 215 to enable signals to be transmitted via link 108 from the aircraft-based network for passenger wireless devices 221-224 to transceivers located on the ground. Included in these components is a communications router function to forward the communication signals to the proper destinations. Thus, signals that are destined for passengers on the aircraft are routed to these individuals, while signals routed to passengers located, for example, on the ground are routed to the Ground Subsystem. Aircraft antenna patterns that typically minimize nadir (Earth directed) effective radiated power (ERP) may be used in the implementation of the antenna(s) 215 on the aircraft to serve the aircraft-based network for passenger wireless devices 221-224.

Passenger Login for System Access

On each aircraft, the passenger access to electronic communications typically is regulated via a passenger's wireless device registration process, where each electronic device must be identified, authenticated, and authorized to receive service. Since the aircraft is a self-contained environment with respect to the wireless communications between the passengers' wireless devices and the airborne wireless network extant in the aircraft, all communications are regulated by the network controller. Thus, when a passenger activates their passenger's wireless device, a communication session is initiated between the passenger's wireless device and the network controller to identify the type of device the passenger is using and, thus, its wireless protocol. A "splash screen" is delivered to the passenger on their wireless device to announce entry into the wireless network portal. Once this is established, the network controller transmits a set of login displays to the passenger's wireless device to enable the passenger to identify themselves and validate their identity (if the passenger's wireless device is not equipped to automatically perform these tasks via a smart client which automatically logs the passenger into the network). As a result of this process, the passenger's wireless device is provided with a unique electronic identification (IP address), and the network can respond to the passenger's wireless device without further administrative overhead. The authentication process may include the use of security processes, such as a password, scan of a passenger immutable characteristic (fingerprint, retina scan, etc.), and the like.

Figure 3:
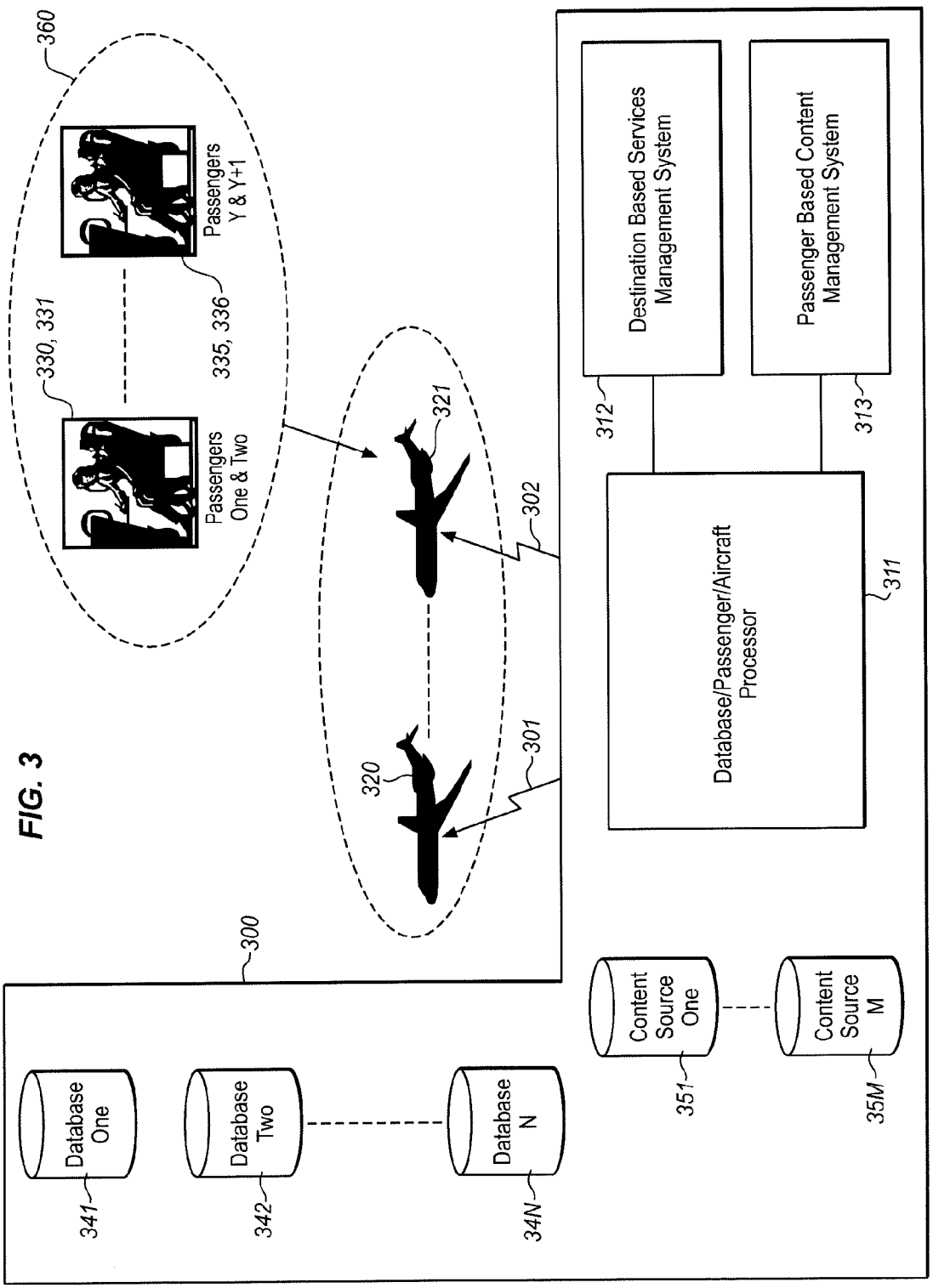
FIG. 3 illustrates, in block diagram form, the architecture of the Customized Electronic Services Delivery System.
Figure 5:
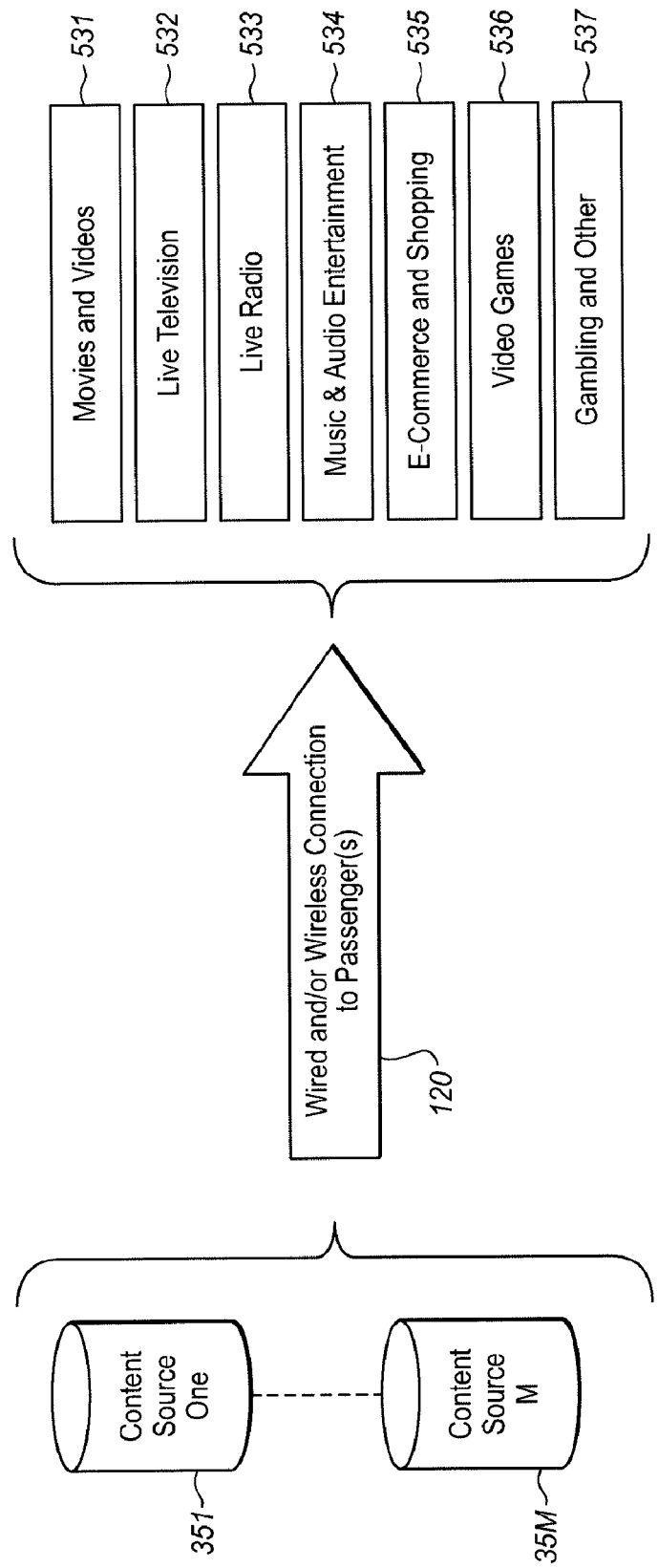
FIG. 5 illustrates a typical mapping of content sources to passenger interests.

Once the passenger's wireless device is logged in, the passenger can access the free standard electronic services that are available from the network or customized electronic services for the particular passenger as is described below. The screens that are presented to the passengers can be customized to present the branding of the airline on which the passenger is traveling. The Customized Electronic Services Delivery System 300 can be located on the ground as shown in FIG. 3 or can optionally be implemented in whole or in part on the individual aircraft 320, 321. For simplicity of description, the Customized Electronic Services Delivery System 300 is shown herein as implemented on the ground and is used to serve a plurality of aircraft 320, 321. The content sources 351-35M on FIGS. 3 and 5, which are contained in the Customized Electronic Services Delivery System 300, provide a multitude of entertainment and information, which are mapped into a plurality of data streams that are available to the passengers on the aircraft. As shown in FIG. 5, these can be categorized into typical category offerings of movies and videos 531, live television 532, live radio 533, music and audio entertainment 534, e-commerce and shopping 535, video games 536, gambling and other interactive services 537, social networking 538, "Flightgeist" (flight-related travel information) 539, wherein each of these category offerings typically include multiple choices available to the passenger. In addition, content can include passenger generated content 361, such as photographs of travel destinations, and community generated content 361, such as a bulletin board where passengers can post comments and descriptions of various topics, such as ratings of restaurants at the destination to which the aircraft is traveling.

Customized Electronic Services Delivery System

FIG. 3 illustrates, in block diagram form, the architecture of the Customized Electronic Services Delivery System 300. A plurality of aircraft 320, 321, each having their respective set of passengers 360, (including passengers 330, 331, 335, 336, for example) are shown as being connected via radio frequency links 301, 302 to the Customized Electronic Services Delivery System 300. Included in the Customized Electronic Services Delivery System 300 for each aircraft, such as aircraft 321, is a set of databases 341-34N which store data relating to the passengers 360 in aircraft 321 as well as their travel and entertainment preferences and travel itinerary (see FIGS. 5, 7, and 8). In addition, the Customized Electronic Services Delivery System 300 has a Processor 311 which runs a plurality of programs, such as Destination-Based Services Management System 312 and Passenger-Based Content Management System 313, as are described below, and the administration routines. A plurality of content sources 351-35M optionally can be included in Customized Electronic Services Delivery System 300 or may be accessed via communication links (not shown) to remote sites where the content sources are located and managed either by the airline or third party vendors.

In operation, the communications apparatus (such as that shown in FIG. 2) located on an aircraft 321 establish wireless communications with the Customized Electronic Services Delivery System 300, which in turn establishes communication sessions with the active ones of passengers' wireless devices located on the aircraft to offer and provide electronic services. The electronic services are customized for the passenger and may include in-flight entertainment services, such as multi-media presentations, as well as destination-based services which link the passenger's existing travel plans with offers for additional services that are available to the passenger at their nominal destination and their planned travel schedule. The initiation of communication sessions by the passenger's wireless device includes the passenger's wireless device being identified and authenticated by the network on board the aircraft (as described above) in conjunction with the Customized Electronic Services Delivery System 300, so the passenger's wireless device is provided with a unique identification, and the Customized Electronic Services Delivery System 300 can respond to the passenger's wireless device without further administrative overhead. The authentication process may include the use of security processes, such as a password, scan of a passenger immutable characteristic (fingerprint, retina scan, etc.), and the like.

Figure 6:
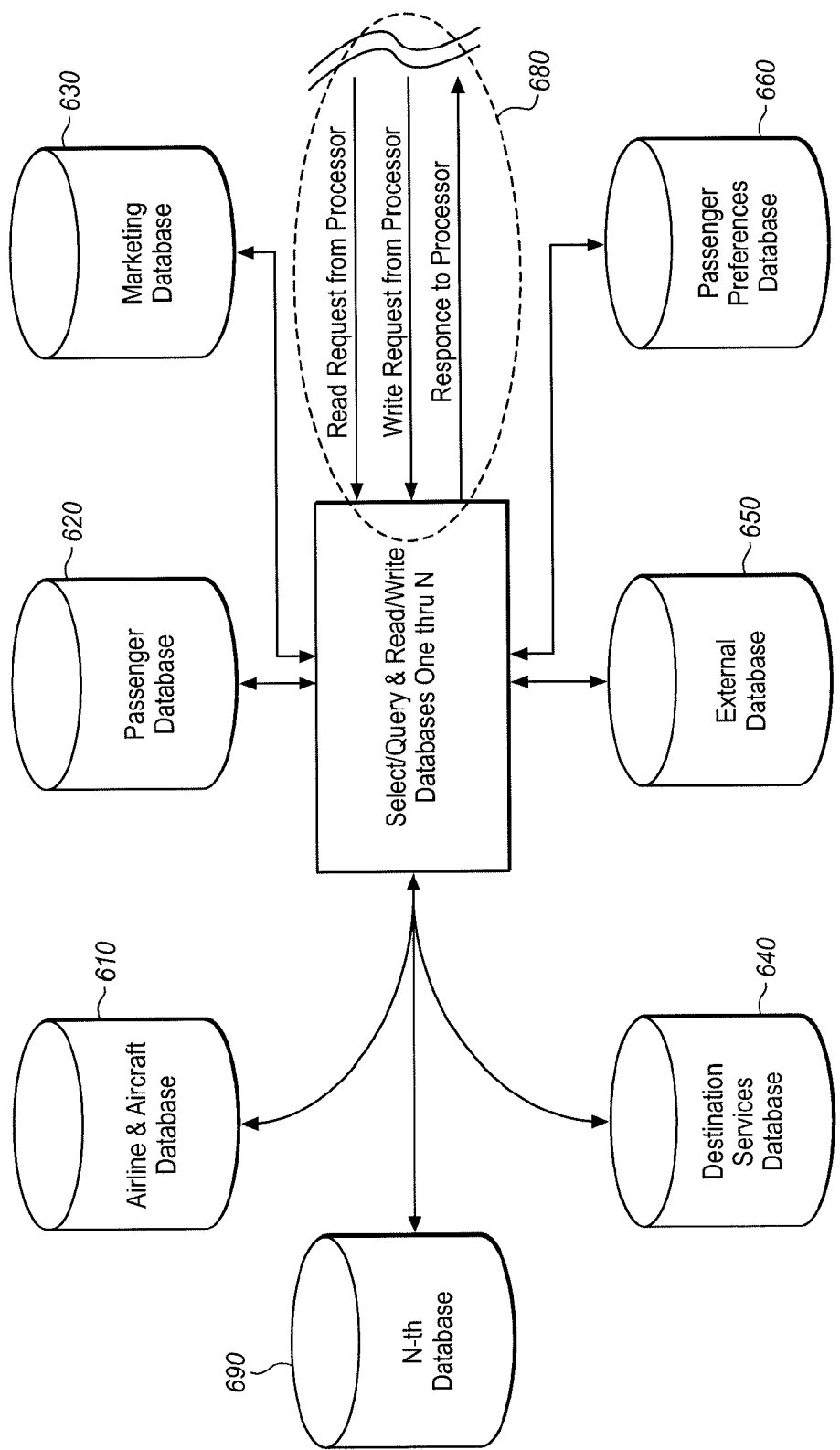
FIG. 6 illustrates, in block diagram form, a typical configuration of databases used by the Customized Electronic Services Delivery System.

Passenger-Based Content Management System 313 provides the passengers with access to both standard content offerings and various levels of custom content offerings, which offerings can be customized on a per passenger basis. As shown in FIG. 6, there are a number of databases that are included in the Customized Electronic Services Delivery System 300 and which communicate with the Processor 311. The database manager 670 includes software not only to manage the databases 610-690, but also to formulate queries to the passengers to offer electronic services based on the passenger's past history of purchases and present authorizations for services.

Figure 7:
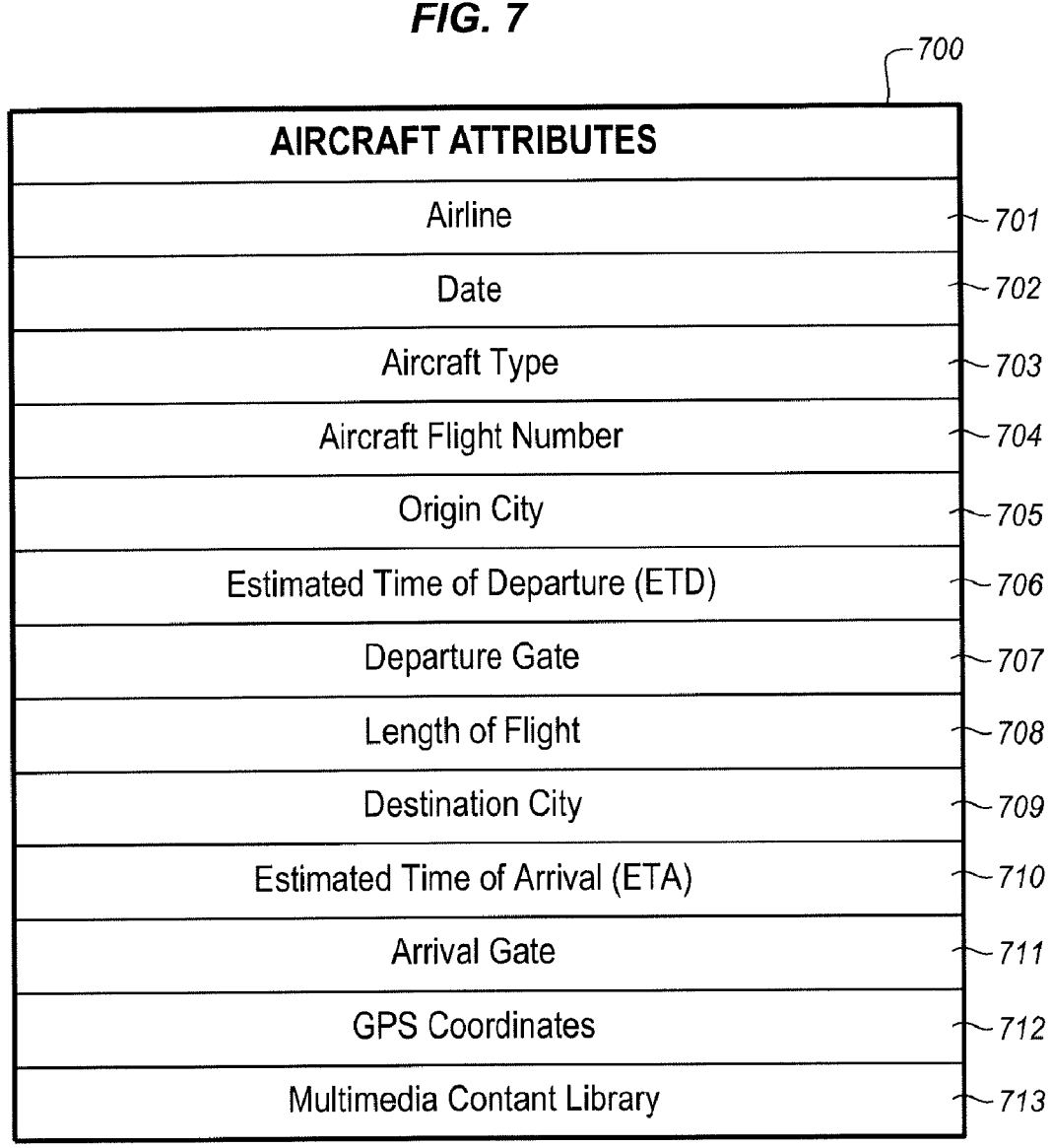
FIGS. 7-8 illustrate typical sets of data used by the Customized Electronic Services Delivery System for the delivery of destination-based services and subscriber specific content.

These databases typically include an Airline/Aircraft database 610 that maintains a listing of the various airlines served by the Customized Electronic Services Delivery System 300 and the services that they offer to their passengers, as well as a listing of the aircraft of each airline that are presently in operation. Typical entries for the Aircraft portion 700 of this airline/aircraft database 610 is shown in FIG. 7, where the airline 701, date of the flight as well as day of the week and present time 702, and the airline assigned flight number 704 are listed. In conjunction with this data are the particulars for the flight that are associated with this flight, such as origin city/airport 705, estimated time of departure 706, and the departure gate 707. The length of this flight 708 is also listed, as are the destination city/airport 709, estimated time of arrival including an indication of the amount of time the flight is ahead or behind schedule 710, and the arrival gate 711. The database can be periodically updated to list the GPS coordinates 712 of this aircraft, and typically provides a listing 713 of the multi-media content resident on board the aircraft. Aircraft operational data can also be included, such as altitude 714, vertical speed 715, horizontal speed 716 and a listing of connecting flights 717 that are available at the destination airport. This data enables the Customized Electronic Services Delivery System 300 to formulate service offerings for the passengers on this flight as well as the delivery of content and offers to the passengers during the flight as is described below.

Figure 8:
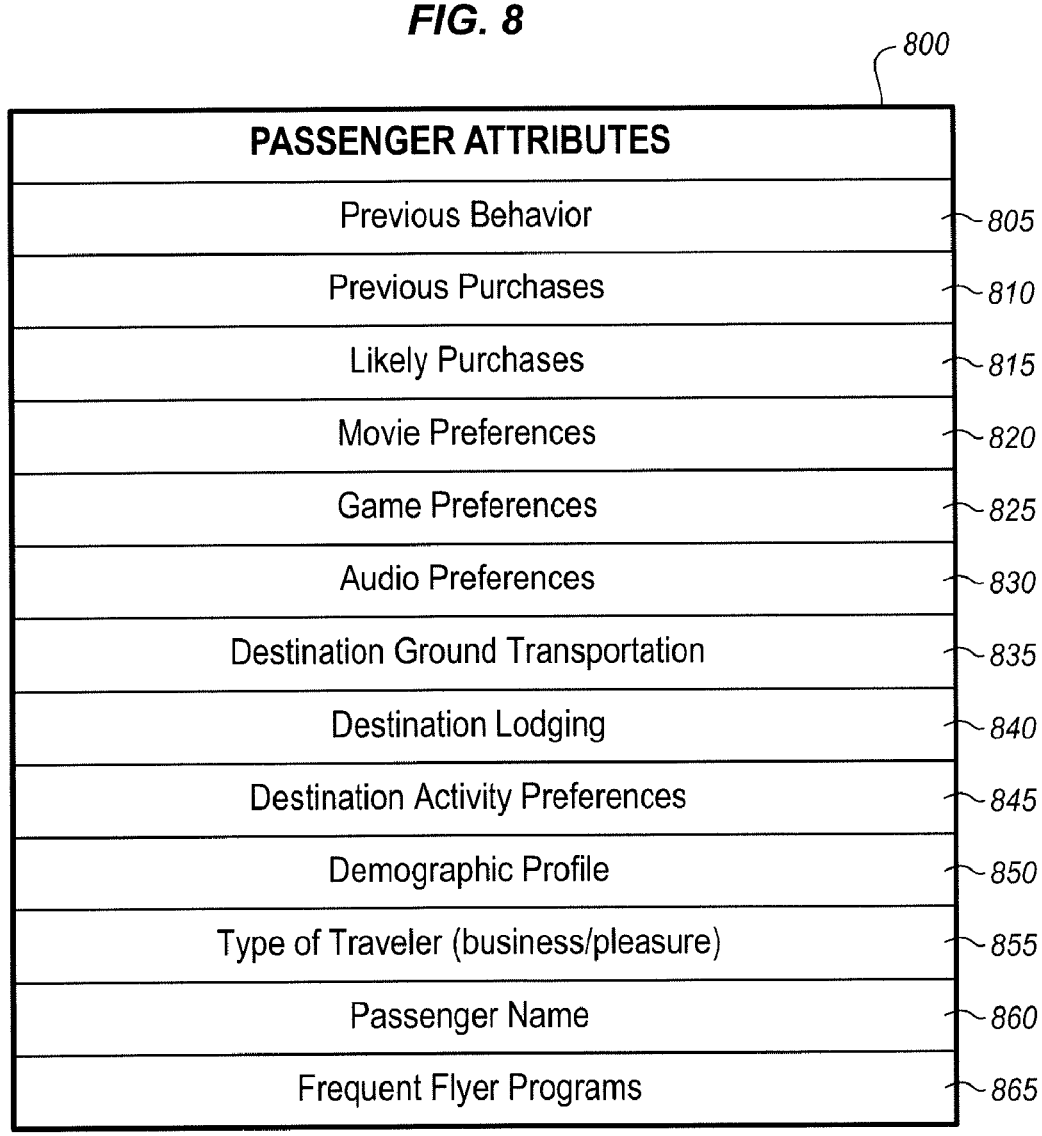

A Passenger database 620 maintains a listing of the passenger attributes, typically maintained for the frequent flyer passengers for the various airlines. A typical passenger-specific entry 800 for the Passenger database 620 as shown in FIG. 8, where the passenger name 860, their demographic profile (including credit card information) 850, list of frequent flyer programs 865, and the type of travel 855, are listed. Data indicative of the past activities of this passenger are listed, such as previous behavior (activities on flight) 805, previous purchases 810, likely purchases 815 as estimated by statistical prediction programs, movie preferences 820, game preferences 825, and audio preferences 830 are stored. Finally, the present trip for this passenger is characterized, with the destination lodging 840, ground transportation 835, and activity preferences 845 for this type of destination or for this particular destination being noted. The previous behavior database 805 can record information that is specific in terms of the past browsing history of the passenger, including sites visited and the time spent on each site. This enables the system to estimate the passenger's interest in various subjects and products in order to offer electronic services that are pertinent to this passenger. Finally, passenger generated content 870 can be provided, such as photographs of travel destinations.

The Marketing database 630 can make use of this data in the Passenger database 620 as well as data relating to destination services as stored in Destination Services database 640 (as described in more detail below) to generate offerings of additional services to the passenger based on their present travel plans. Additional databases 650 can be maintained to support additional services and feature offerings and a passenger generated content database 690 can provide information, such as photographs of travel destinations, which data is obtained from the passenger specific entry 800 in the Passenger database 620.

Passenger-Based Content Management System

The Customized Electronic Services Delivery System 300 can offer a number of electronic services that are customized for the passenger and, for the sake of illustration, two such electronic services are disclosed herein. Destination-Based Services Management System 312 and Passenger-Based Content Management System 313 each provide a set of electronic services and makes use of the aircraft identification, passenger identification and authentication, and communication management capabilities provided by Processor 311 in Customized Electronic Services Delivery System 300. These electronic services typically are activated for each aircraft when the aircraft is in flight.

Figure 4:
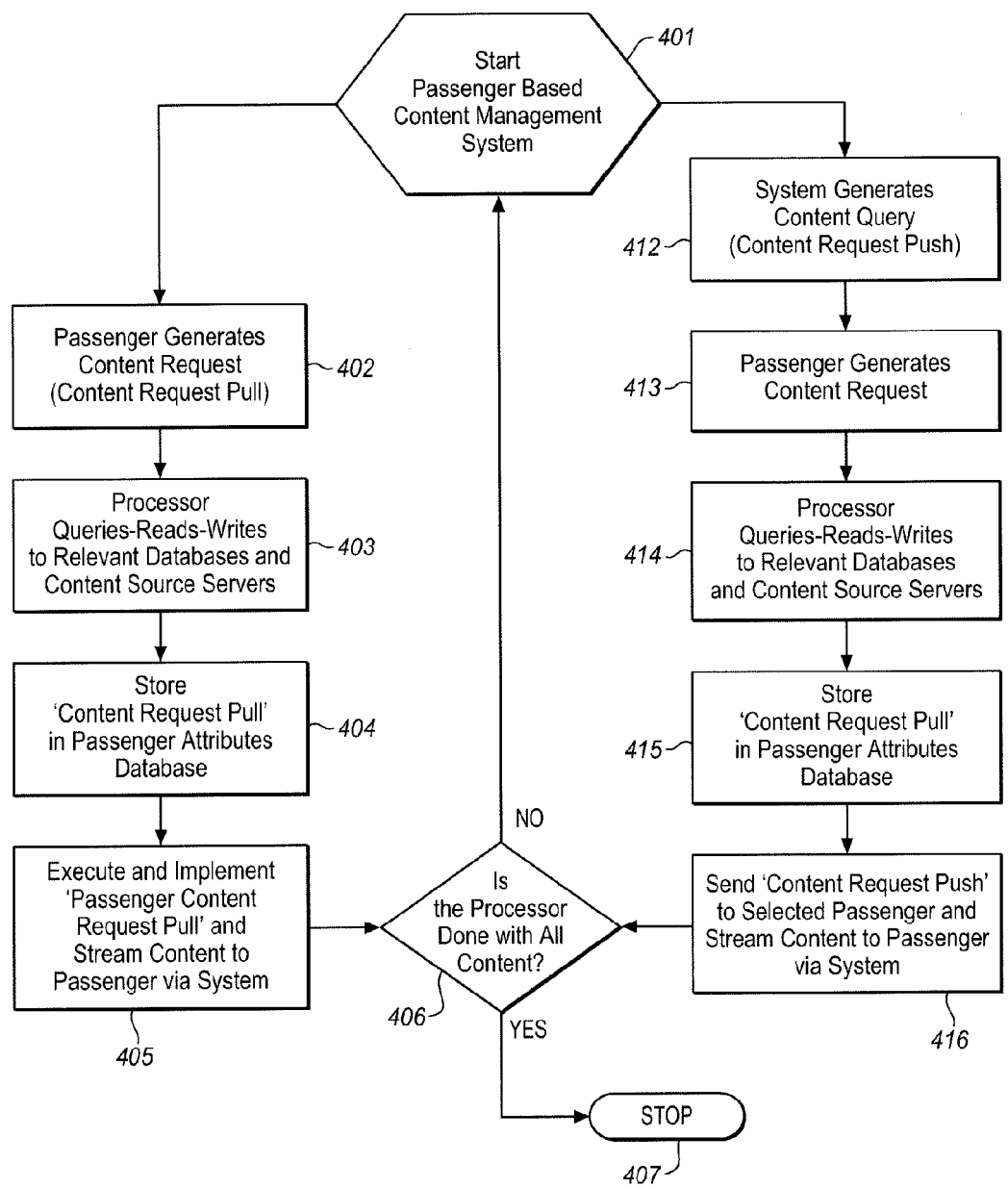
FIG. 4 illustrates, in flow diagram form, the typical operation of the Passenger-Based Content Management System segment of the Customized Electronic Services Delivery System for the delivery of content that is customized to the passenger.

FIG. 4 illustrates, in flow diagram form, the typical operation of the Passenger-Based Content Management System 313 segment of the Customized Electronic Services Delivery System 300 for the delivery of content that is customized to the passenger, while FIG. 6 illustrates, in block diagram form, a typical configuration of databases used by the Customized Electronic Services Delivery System 300. The Passenger-Based Content Management System 313 maintains a listing in its database of the various content that are available from a plurality of sources, which sources can be resident on the aircraft, on the ground at the Customized Electronic Services Delivery System 300, or remotely located.

These content sources provide a multitude of entertainment and information, which are mapped by the Customized Electronic Services Delivery System 300 into a plurality of data streams that are available to the passengers on the aircraft. As shown in FIG. 5, these can be categorized into typical category offerings of movies and videos 531, live television 532, live radio 533, music and audio entertainment 534, e-commerce and shopping 535, video games 536, and gambling and other interactive services 537, wherein each of these category offerings typically include multiple choices available to the passenger.

At step 401, the Passenger-Based Content Management System 313 initiates its operation and either launches one of the two processes (402-405 or 412-416) illustrated in FIG. 4 or simultaneously runs both of these processes. A first process is the passenger-generated request process (402-405), which is also termed "content request pull", while the second process is the system-generated query (412-416), which is also termed "content request push". For the sake of simplicity of description, the two processes are described as being executed sequentially, with the order of presentation of these two processes being arbitrary.

At step 402, Passenger-Based Content Management System 313 responds to a passenger's wireless device generated content request, where the passenger requests a content delivery service from the set of content services available from Passenger-Based Content Management System 313. In response to the receipt of a content request from the passenger's wireless device at step 403, Passenger-Based Content Management System 313 verifies that the passenger's wireless device is subscribed to the requested content delivery service and the content is presently available. If the passenger is not pre-paid for the requested content delivery service, then the Passenger-Based Content Management System 313 executes a payment routine (not shown) where the passenger can pay for the requested content delivery service.

At step 404, the Passenger-Based Content Management System 313 updates the Passenger Attributes Database entries for this passenger, to record the present content selection for the passenger and thereby to maintain a current history of the passenger preferences. At step 405, the Passenger-Based Content Management System 313 executes the retrieval of the requested content and delivers the content to the passenger via the aircraft-based network described in FIG. 2.

At step 406, Passenger-Based Content Management System 313 determines whether additional passenger requests remain to be served and, if so, returns to step 401 where the next one of these requests are served. If not, processing exits at step 407. The Passenger-Based Content Management System 313 can serve all of the passenger requests in steps 402-405 or can alternate between this routine and the routine of steps 412-416.

At step 412, Passenger-Based Content Management System 313 initiates a query to a selected passenger's wireless device, where the Passenger-Based Content Management System 313 offers the selected passenger a content delivery service from the set of content services available from Passenger-Based Content Management System 313. The passenger can view this query and then the passenger, at step 413, can elect to receive a content service from the Passenger-Based Content Management System 313. At step 414, the Passenger-Based Content Management System 313 verifies that the passenger's wireless device is subscribed to the requested content delivery service and the content is presently available. If the passenger is not pre-paid for the requested content delivery service, then the Passenger-Based Content Management System 313 executes a payment routine (not shown) where the passenger can pay for the requested content delivery service.

At step 415, the Passenger-Based Content Management System 313 updates the Passenger Attributes Database entries for this passenger, to record the present content selection for the passenger and thereby to maintain a current history of the passenger preferences. At step 416, the Passenger-Based Content Management System 313 executes the retrieval of the requested content and delivers the content to the passenger via the aircraft-based network described in FIG. 2.

At step 406, Passenger-Based Content Management System 313 determines whether additional passenger requests remain to be served and, if so, returns to step 401 where the next one of these requests are served. If not, processing exits at step 407.

Destination-Based Services Management System

Figure 9:
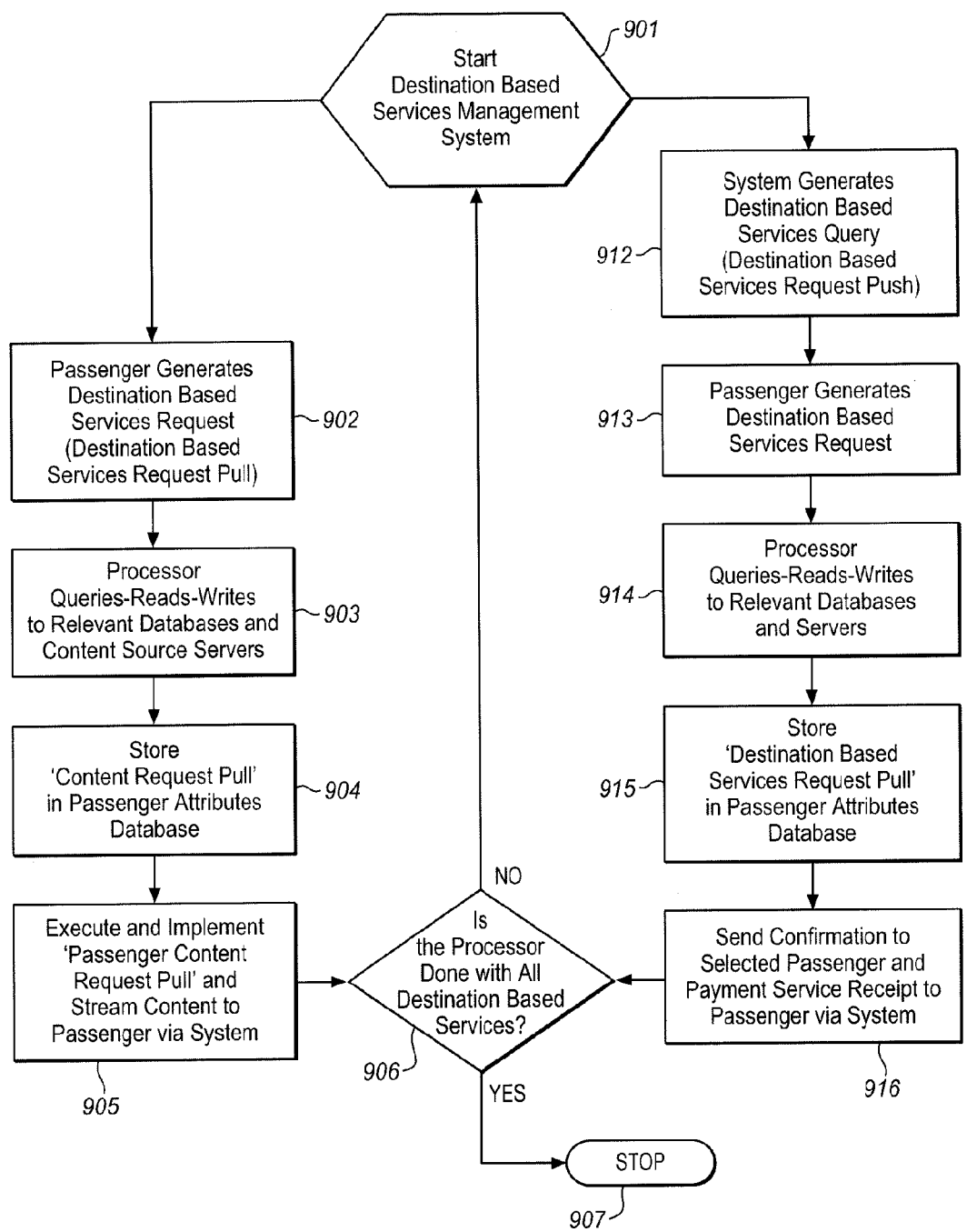
FIG. 9 illustrates, in flow diagram form, the typical operation of the Destination-Based Services Management System segment of the Customized Electronic Services Delivery System for the delivery of destination services that are customized to the specific passenger.

FIG. 9 illustrates, in flow diagram form, the typical operation of the Destination-Based Services Management System 312 segment of the Customized Electronic Services Delivery System 300. FIGS. 7-8 illustrate typical sets of data used by the Customized Electronic Services Delivery System for the delivery of destination-based services. These differ from the content described above in that the offerings are passenger specific and modified to reflect the travel plans of the passenger; hence, they are termed "destination-based services".

At step 901, the Destination-Based Services Management System 312 initiates its operation and either launches one of the two processes (902-905 or 912-916) illustrated in FIG. 9 or simultaneously runs both of these processes. A first process is the passenger-generated request process (902-905), which is also termed "services request pull", while the second process is the system generated query (912-916), which is also termed "services request push". For the sake of simplicity of description, the two processes are described as being executed sequentially.

At step 902, Destination-Based Services Management System 312 responds to a passenger's wireless device generated destination-based services request, where the passenger requests a destination-based service from the set of standard destination-based services available from Destination-Based Services Management System 312. In response to the receipt of a destination-based services request from the passenger's wireless device at step 903, Destination-Based Services Management System 312 verifies that the passenger's wireless device is subscribed to the requested destination-based service and the destination-based service is presently available. If the passenger is not pre-paid for the requested destination-based service, then the Destination-Based Services Management System 312 executes a payment routine (not shown) where the passenger can pay for the requested destination based service.

At step 904, the Destination-Based Services Management System 312 updates the Passenger Attributes Database entries for this passenger, to record the present destination-based service selection for the passenger and thereby to maintain a current history of the passenger preferences. At step 905, the Destination-Based Services Management System 312 executes a reservation for the requested destination-based service and delivers a receipt for the destination-based service to the passenger via the aircraft-based network described in FIG. 2.

At step 906, Destination-Based Services Management System 312 determines whether additional passenger requests remain to be served and, if so, returns to step 901 where the next one of these requests are served. If not, processing exits at step 907.

At step 912, Destination-Based Services Management System 312 initiates a query to a selected passenger's wireless device, where the Destination-Based Services Management System 312 offers the selected passenger a destination-based service from the set of destination-based services available from Destination-Based Services Management System 312 (as described in additional detail below). In response to the receipt of a destination-based services query, the passenger at step 913 can elect to order a destination-based service from the Destination-Based Services Management System 312. At step 914, the Destination-Based Services Management System 312 verifies that the passenger is subscribed to the requested destination-based service and the service is presently available. If the passenger is not pre-paid for the requested destination-based service, then the Destination-Based Services Management System 312 executes a payment routine (not shown) where the passenger can pay for the requested destination-based service, using a credit card or charging the service to their hotel room at the destination, or any other means of payment that can be used.

At step 915, the Destination-Based Services Management System 312 updates the Passenger Attributes Database entries for this passenger, to record the present destination-based service selection for the passenger and thereby to maintain a current history of the passenger preferences. At step 916, the Destination-Based Services Management System 312 executes the reservation for the requested destination-based service and delivers a receipt for the destination-based service to the passenger via the aircraft-based network described in FIG. 2.

At step 916, Destination-Based Services Management System 312 determines whether additional passenger requests remain to be served and, if so, returns to step 901 where the next one of these requests are served. If not, processing exits at step 907.

Destination-Based Services

As noted above, the Customized Electronic Services Delivery System 300 can offer passenger- and destination-specific offerings for the passenger traveling on a flight. Since the flight destination, the passenger identification (and seat number on the flight), and the passenger preferences are known, the Customized Electronic Services Delivery System 300 can use the data in the marketing database 630 to create travel package offerings for a selected passenger. For example, the Destination-Based Services Management System 312 can cycle through the passengers on a particular flight and determine which passengers are traveling for pleasure (for example). The Destination-Based Services Management System 312 can read the arrival time, destination resort, ground transportation, as well as the number of people in this travel party from the databases. The Destination-Based Services Management System 312 can then offer restaurant reservations for this passenger and their traveling companions, selecting the restaurant based on this passenger's past recorded preferences as well as restaurants at this location that are partner with the airline on which the passenger is traveling or the resort at which the passenger is staying. In addition, resort activities can be offered and reservations made using the Destination-Based Services Management System 312, again since the passenger destination and preferences are known as well as possibly past activities engaged by the passenger.

The destination-based services can also be utilized in the case of bad weather and cancelled flights. The passengers scheduled for a particular flight that is delayed or cancelled can be offered ground transportation, lodging, and restaurant reservations as a package once the flight is cancelled. This would, in part, reduce the turmoil caused by such travel interruptions and gain a significant amount of goodwill toward the airline for anticipating and accommodating the needs of the passengers. This also enables the airline to route delayed passengers to partner hotels and restaurants, thereby providing additional benefits to the airline.

SUMMARY

The Customized Electronic Services Delivery System stores data indicative of a plurality of electronic services that are available to passengers who are located onboard an aircraft, as well as data indicative of preferences of passengers. The electronic services include in-flight entertainment services, as well as destination-based services which link the passenger's existing travel plans with offers for additional services that are available to the passenger at their nominal destination and their planned travel schedule.

What is claimed as new and desired to be protected by Letters Patent of the United States is:

1. A system for providing customized destination-based services to passengers, equipped with wireless electronic devices, who are located onboard an aircraft, comprising:
    a passenger database for storing data which indicates the identity of each of a plurality of passengers who are located onboard an aircraft and data indicative of a final destination for individual passengers;
    a passenger preference database for storing data indicative of preferences of passengers for said plurality of destination-based services;
    a destination-based service management system for autonomously initiating offers to passengers for reservations for at least one destination-based service, comprising:
        an autonomous passenger selection process, responsive to said data stored in said passenger database, for selecting one of said passengers for receipt of an offer of destination-based services,
        a service selection process for automatically associating at least one passenger-preferred destination-based service with an identified passenger based on said stored data to identify at least one destination-based service selected from the class of destination-based services including: ground transportation, lodging, activities, and dining provided at said destination that is likely to be of interest to the selected passenger,
        an offer generator for generating an offer of said identified destination-based service for said selected passenger,
        a service push service management system for transmitting said offer to said identified passenger via their wireless electronic device;
    a link, responsive to said passenger selecting a one of said destination-based services, for establishing wireless communications between said passenger wireless electronic device and said destination-based service management system to enable said passenger to purchase said selected destination-based service; and
    a passenger preference update manager responsive to said passenger selecting at least one of said destination-based services, for updating data stored in said passenger preference database to store data indicative of preferences of said individual passenger for said at least one of said destination-based services.

2. The system for providing customized destination-based services of claim 1 further comprising:
    a login server, responsive to said passenger activating their wireless electronic device, for confirming authorization of said passenger to access said destination-based service management system.

3. The system for providing customized destination-based services of claim 1 further comprising:
    a reservation server, responsive to said passenger selecting at least one of said destination-based services, for transmitting a receipt for said selected destination-based service to said passenger wireless electronic device.

4. The system for providing customized destination-based services of claim 3 further comprising:
    a passenger preference update manager responsive to said passenger selecting at least one of said destination-based services, for updating data stored in said passenger preference database to store data indicative of preferences of said individual passenger for said at least one of said destination-based services.

5. The system for providing customized destination-based services of claim 1 further comprising:
    communication services for managing provision of said wireless communications as a function of at least one of media, bandwidth, and class of service.

6. A method of providing customized destination-based services to passengers, equipped with wireless electronic devices, who are located onboard an aircraft, comprising:
    storing data in a passenger database which indicates the identity of a plurality of passengers who are located onboard an aircraft and data indicative of a final destination for said individual passenger;
    storing passenger preference data indicative of preferences of passengers for said plurality of destination-based services;
    operating a destination-based service management system, for autonomously initiating offers to passengers for reservations for at least one destination-based service, comprising:
        autonomously selecting a passenger, selecting one of said passengers for receipt of an offer of destination-based services,
        automatically associating at least one passenger-preferred destination-based service with an identified passenger based on said stored data to identify at least one destination-based service selected from the class of destination-based services including: ground transportation, lodging, activities, and dining provided at said destination that is likely to be of interest to the selected passenger,
        generating an offer of said identified destination-based service for said selected passenger, transmitting said offer to said identified passenger via their wireless electronic device;

establishing, in response to said passenger selecting a one of said destination-based services, wireless communications between said passenger wireless electronic device and said destination-based service management system to enable said passenger to purchase said selected destination-based service; and updating, in response to said passenger selecting at least one of said destination-based services, data stored in said passenger preference database to store data indicative of preferences of said individual passenger for said at least one of said destination-based services.

7. The method of providing customized destination-based services of claim 6 further comprising:
confirming, in response to said passenger activating their wireless electronic device, authorization of said passenger to access said destination-based service management system.

8. The method of providing customized destination-based services of claim 6 further comprising:
transmitting, in response to said passenger selecting at least one of said destination-based services, a receipt for said selected destination-based service to said passenger wireless electronic device.

9. The method of providing customized destination-based services of claim 8 further comprising:
updating, in response to said passenger selecting at least one of said destination-based services, data stored in said passenger preference database to store data indicative of preferences of said individual passenger for said at least one of said destination-based services.

10. The method of providing customized destination-based services of claim 6 further comprising:
managing provision of said wireless communications as a function of at least one of media, bandwidth, and class of service.

11. A system for providing customized destination-based services to passengers, equipped with wireless electronic devices, who are located onboard an aircraft, comprising:
a passenger database for storing data which indicates the identity of each of a plurality of passengers who are located onboard an aircraft and data indicative of a final destination for individual passengers;
a services menu for storing data indicative of destination-based services selected from the class of destination-based services including: ground transportation, lodging, activities, and dining provided at said destination;
a passenger preference manager for storing data in a passenger preferences database indicative of preferences of said passengers for said destination-based services;
a destination-based service management system for autonomously initiating offers to passengers for reservations for at least one destination-based service, comprising:
mapping for associating a plurality of said passengers who are located onboard an aircraft with said destination-based services to create a passenger-specific mapping of destination-based services for said plurality of passengers,
an offer generator for generating an offer of said identified destination based service for said selected passenger,
a service push service management system for transmitting said offer to said identified passenger via their wireless electronic device;
a link, responsive to a passenger located onboard said aircraft selecting a one of said destination-based services, for establishing wireless communications between said passenger wireless electronic device and said services offer server; and
a passenger preference update responsive to said passenger selecting at least one of said destination-based services, for updating data stored in said passenger preference database to store data indicative of preferences of said individual passenger for said at least one of said destination-based services.

12. The system for providing customized destination-based services of claim 11 further comprising:
a reservation system, responsive to said passenger selecting at least one of said destination-based services, for transmitting a receipt for said selected destination-based service to said passenger wireless electronic device.

13. The system for providing customized destination-based services of claim 12 further comprising:
a passenger preference update responsive to said passenger selecting at least one of said destination-based services, for updating data stored in said passenger preference database to store data indicative of preferences of said individual passenger for said at least one of said destination-based services.

14. A method of providing customized destination-based services to passengers, equipped with wireless electronic devices, who are located onboard an aircraft, comprising:
storing data in a passenger database which indicates the identity of a plurality of passengers who are located onboard an aircraft and data indicative of a final destination for individual passengers;
storing data indicative of destination-based services selected from the class of destination-based services including: ground transportation, lodging, activities, and dining provided at said destination;
storing data in a passenger preferences database indicative of preferences of said passengers for said destination-based services;
associating a plurality of said passengers who are located onboard an aircraft with said destination-based services to create a passenger-specific mapping of destination-based services for said plurality of passengers;
generating an offer of said identified destination-based service for said selected passenger;
transmitting said offer to said identified passenger via their wireless electronic device; and
establishing, in response to a passenger located onboard said aircraft selecting a one of said destination-based services, wireless communications between said passenger wireless electronic device and said destination-based service management system; and
updating, in response to said passenger selecting at least one of said destination-based services, data stored in said passenger preference database to store data indicative of preferences of said individual passenger for said at least one of said destination-based services.

15. The method of providing customized destination-based services of claim 14 further comprising:
transmitting, in response to said passenger selecting at least one of said destination-based services, a receipt for said selected destination-based service to said passenger wireless electronic device.

16. The method of providing customized destination-based services of claim 15 further comprising:
updating, in response to said passenger selecting at least one of said destination-based services, data stored in said passenger preference database to store data indicative of preferences of said individual passenger for said at least one of said destination-based services.

* * * * *